C. Harrison.
Water Closet Valve.
N°. 92,190.  Patented Jul. 6. 1869.
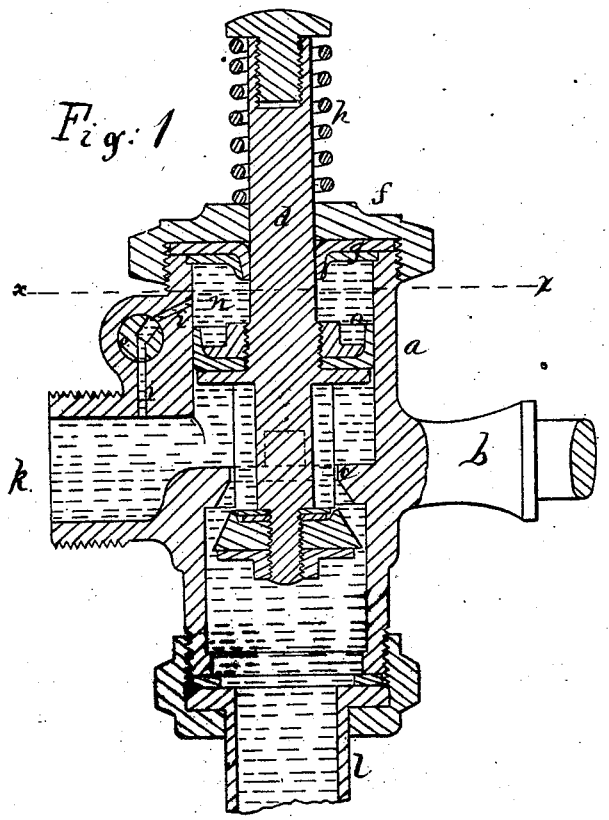
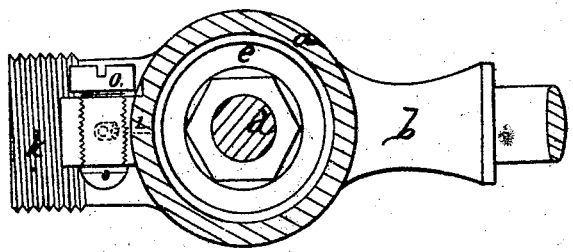
Witnesses  
Geo. D. Walker  
Chas. H. Smith
Inventor  
Chas. Harrison

United States Patent Office.

CHARLES HARRISON, OF NEW YORK, N. Y.

Letters Patent No. 92,190, dated July 6, 1869.

---

IMPROVEMENT IN SELF-CLOSING COCKS FOR WATER-CLOSETS.

---

The Schedule referred to in these Letters Patent and making part of the same.

---

*To all whom it may concern:*

Be it known that I, CHARLES HARRISON, of the city and State of New York, have invented and made an Improvement in Cocks for Water-Closets; and I do hereby declare the following to be a full, clear, and exact description of the said invention, reference being had to the annexed drawing, making part of this specification, wherein—

Figure 1 is a vertical section of the said closet-cock, and

Figure 2 is a sectional plan of the same, at the line $x\ x$.

Similar marks of reference denote the same parts.

Closet-cocks have heretofore been made with a variable water-chamber, to control the closing of a valve, and allow the water to run a given length of time. There has, however, been difficulty in regulating these cocks to suit the varying pressures of water in different places, because, with heavy pressures, the cock closes too rapidly, and does not allow sufficient flow of water, and with light pressures the water is wasted.

My invention relates to a cock for water-closets, in which the water-leakage is regulated from the outside of the cock, so as to vary the time in which the water is expelled from the variable chamber, and consequently the quantity of water that is allowed to flow into the closet.

In the drawing—

$a$ is the cylinder or band of the cock, connected to the closet by the arm $b$, or other suitable means; $c$ is the valve-seat; $d$, the valve-stem; $e$, the cup-leather piston; $f$, the cap; $g$, the leather packing; and $h$, the spring to close the valve; all of the general character heretofore employed.

$l$ is the inlet-coupling or pipe, and $k$ is the outlet-coupling or pipe to the water-closet.

The cup-leather or piston $e$ allows water to rush past it when the valve is pressed down to open the seat, and when the pressure is removed, the spring $h$ and the rush of water tend to close the valve, and the cup-leather or piston $e$ confines the water in the variable chamber $n$.

Between the chamber $n$ and the outlet-pipe $k$, is a small hole, $i$, to which a regulating-screw, $o$, is applied, acting in the capacity of a cock, so that by turning the same from outside, the opening from $i$ will be regulated, to render the discharge of water from the chamber $n$ more or less rapid, and the closing of the valve is thereby under control, so that it may be adjusted or varied according to the head of water, or according to the amount required for washing the closet, and this regulation is effected without disturbing any of the connections or opening the cock, and in case of obstruction in the leakage-pipe $i$, it can generally be removed by turning the screw $o$, but if not, the screw can be taken out very easily.

What I claim, and desire to secure by Letters Patent, is—

A water-closet cock, in which the leakage-waterway $i$, between the variable chamber $n$ and the outlet $k$, is regulated from outside the cock, as and for the purposes set forth.

In witness whereof, I have hereunto set my signature, this 3d day of March, A. D. 1869.

CHAS. HARRISON.

Witnesses:
CHAS. H. SMITH,
GEO. T. PINCKNEY.